United States Patent [19]

Uhlmann et al.

[11] Patent Number: 5,426,989

[45] Date of Patent: Jun. 27, 1995

[54] METHOD AND A DEVICE IN SPINDLES

[76] Inventors: Jack Uhlmann, Langviksvagen 31, S-392 47 Kalmar; Patrik Soderlund, Stora Raby 8, S-223 7 Lund; Lennart Sjostedt, Kyrkekullvagen 7, S-360 43 Aryd; Pierre Stahl, Tingshuset, Tjureda, S-360 40 Rottne, all of Sweden

[21] Appl. No.: 965,268

[22] PCT Filed: Jul. 16, 1991

[86] PCT No.: PCT/SE91/00498

§ 371 Date: Jun. 3, 1993

§ 102(e) Date: Jun. 3, 1993

[87] PCT Pub. No.: WO92/01878

PCT Pub. Date: Feb. 6, 1992

[30] Foreign Application Priority Data

Jul. 16, 1990 [SE] Sweden ................. 9002441

[51] Int. Cl.⁶ ............... F16H 25/24; B60S 9/18
[52] U.S. Cl. ................. 74/89.15; 74/459; 254/98; 254/420
[58] Field of Search ........... 74/424.8 R, 424.8 A, 74/459, 89.15; 254/98, 103, 420; 269/241

[56] References Cited

U.S. PATENT DOCUMENTS

| 1,193,672 | 8/1916 | De Groot | 74/424.8 A |
| 2,556,572 | 6/1951 | Brinkhurst | 74/424.8 A |
| 2,919,596 | 1/1960 | Kuehl | 74/441 |
| 3,150,535 | 9/1964 | De Valliere | 74/424.8 A |
| 4,479,748 | 10/1984 | Uhlmann | 411/412 |
| 4,921,269 | 5/1990 | Scully | 254/420 X |

FOREIGN PATENT DOCUMENTS

| 2601731 | 1/1988 | France . | |
| 418216 | 5/1984 | Sweden . | |
| 169227 | of 1915 | United Kingdom . | |
| 779153 | 7/1957 | United Kingdom | 269/241 |

Primary Examiner—Allan D. Herrmann
Attorney, Agent, or Firm—Howson & Howson

[57] ABSTRACT

For carrying out a method to displace an object from a resting position to to a working position or vice versa, a device (1) is arranged comprising a screw (3) with two threads (7, 9) with different pitches and a body (2, 4) with internal threads matching the threads of screw (3). The body is shaped in two parts (2) and (4), which are arranged to be able to be displaced relative to one another in the axial direction of the screw (3), whereby a changing from one thread to another thread can be done by changing the distance between said parts (2, 4) of the body. The screw (3) is arranged to a first object and the body (2, 4) to a second object. In utilization of the method the object can be rapidly displaced to the resting position or working position by the fact that the screw and body are engaged with one another in the one thread or a coarse thread and when needed the screw and body are brought to change to an engagement with one another in the other thread or a fine thread, for example by an increased tightening force action.

5 Claims, 9 Drawing Sheets

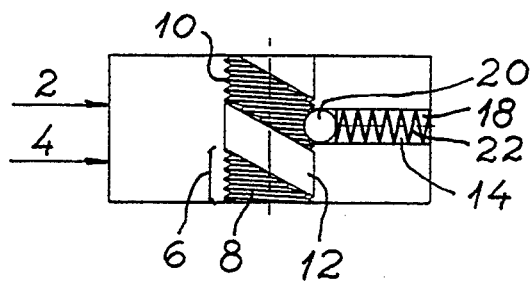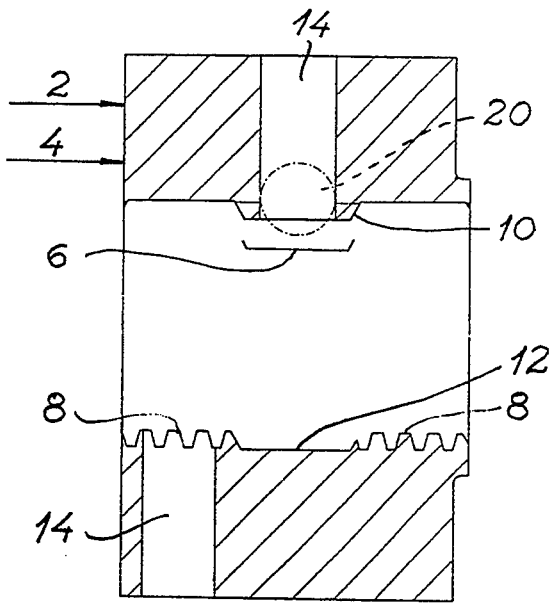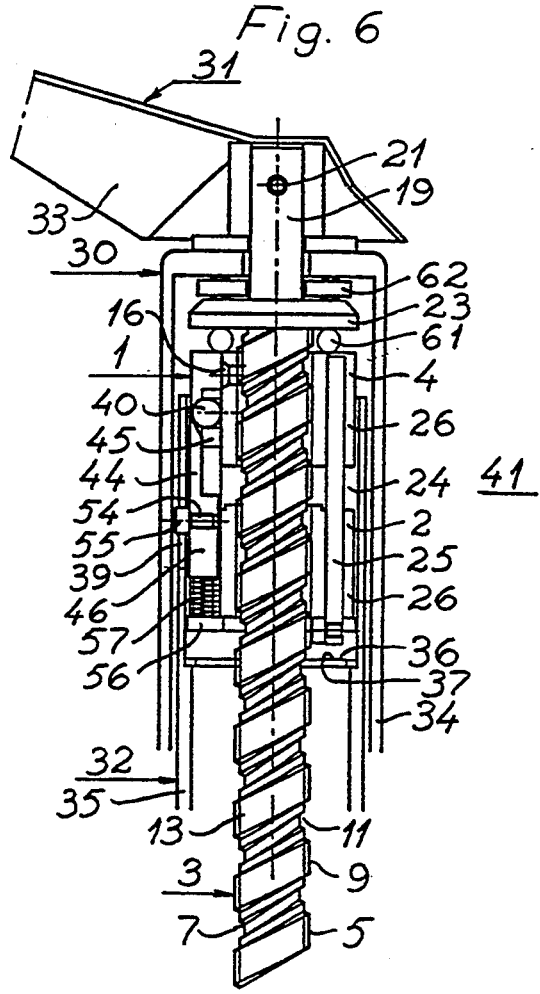

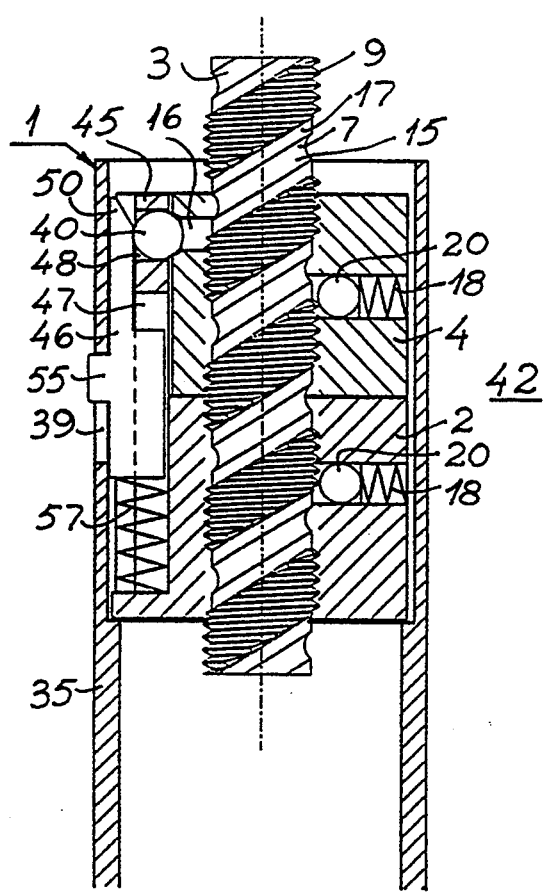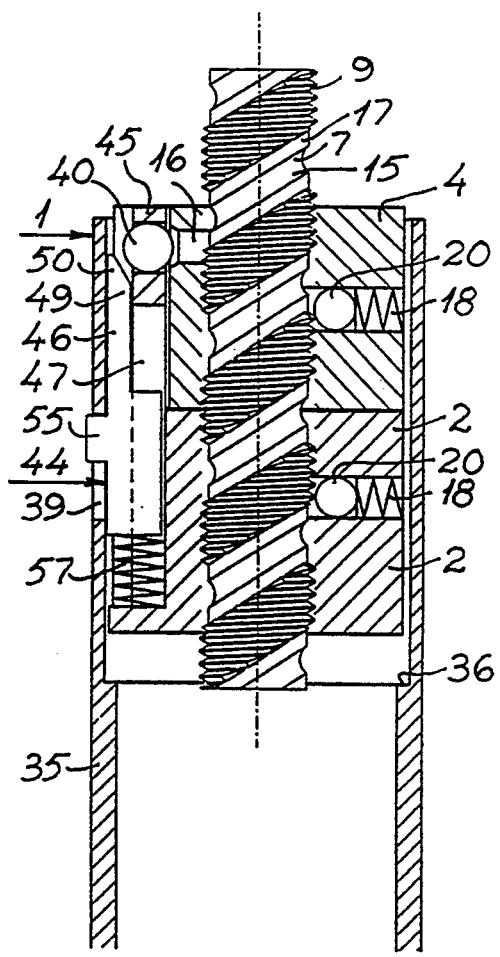

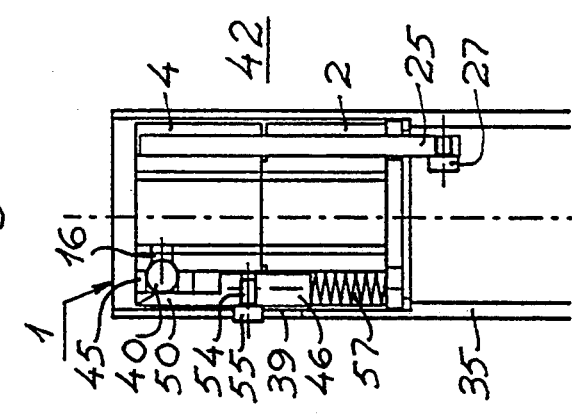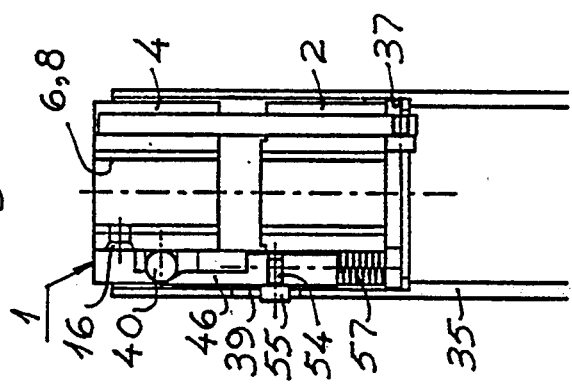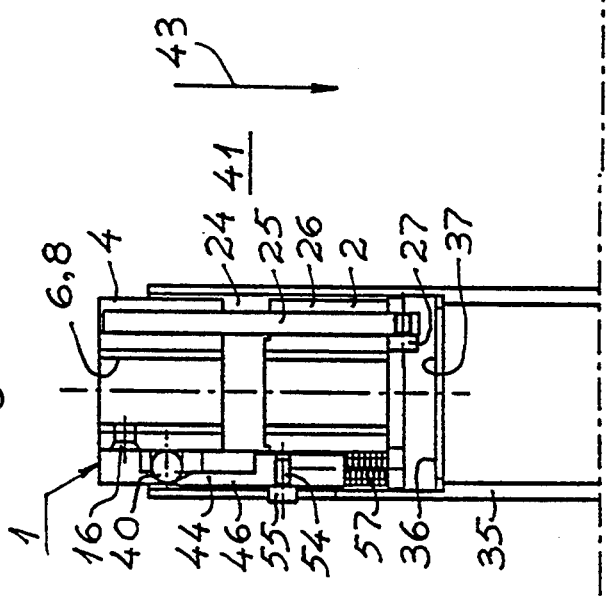

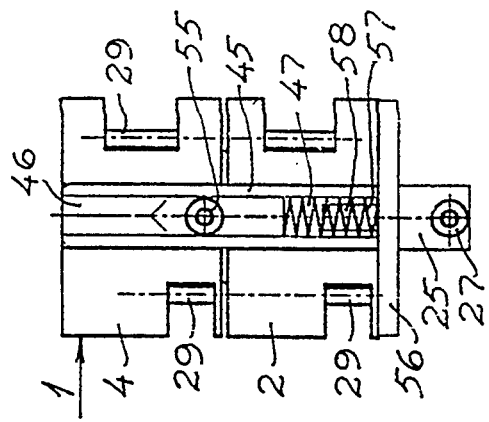
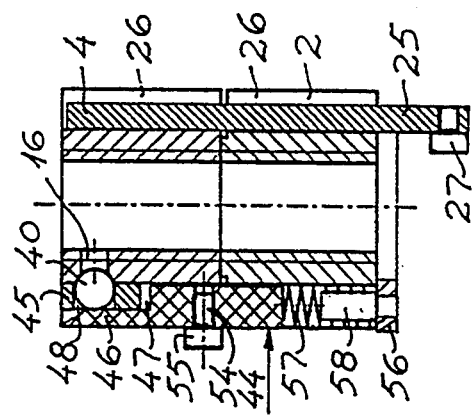
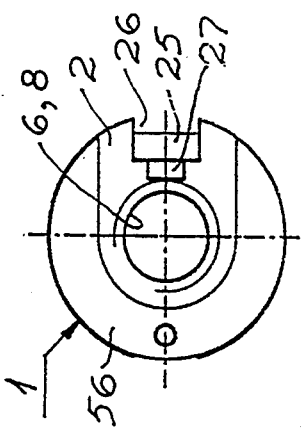
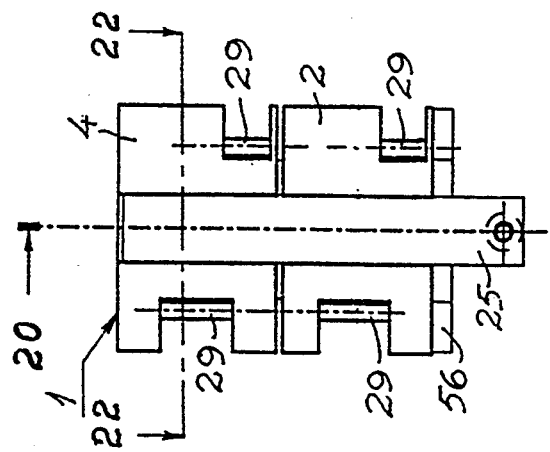
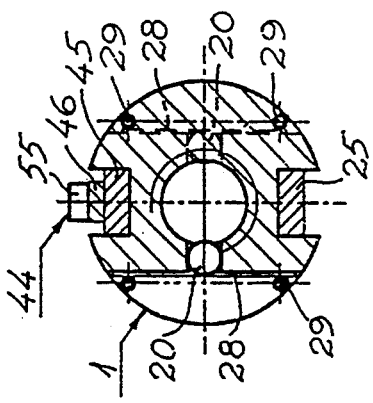

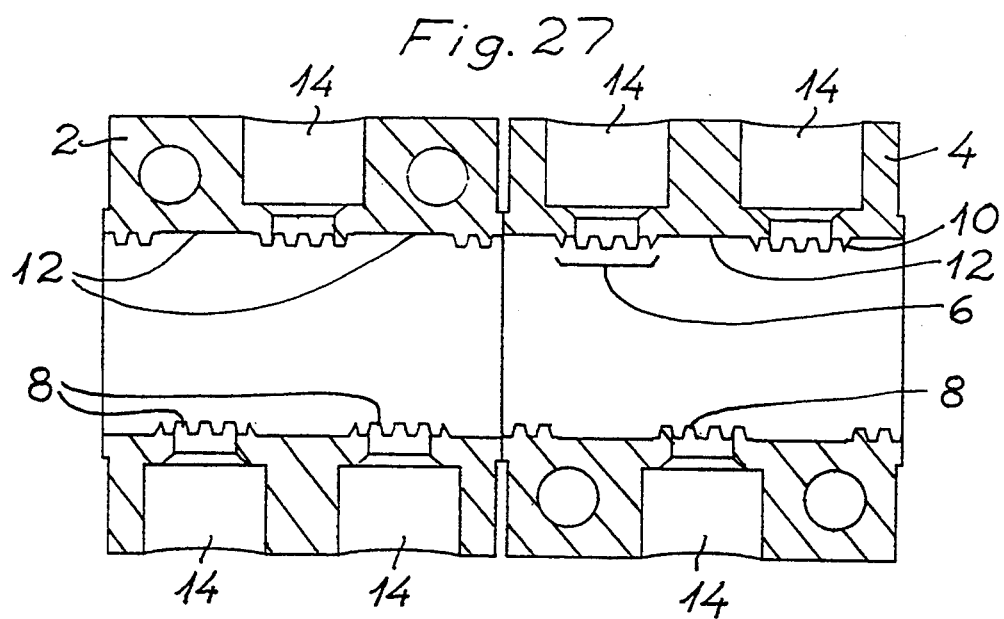
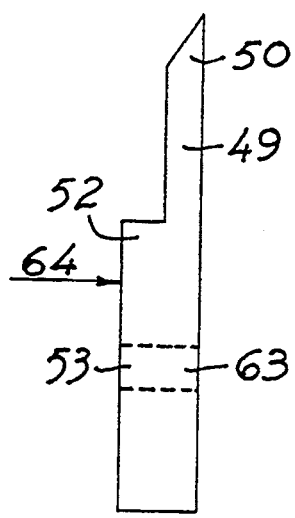
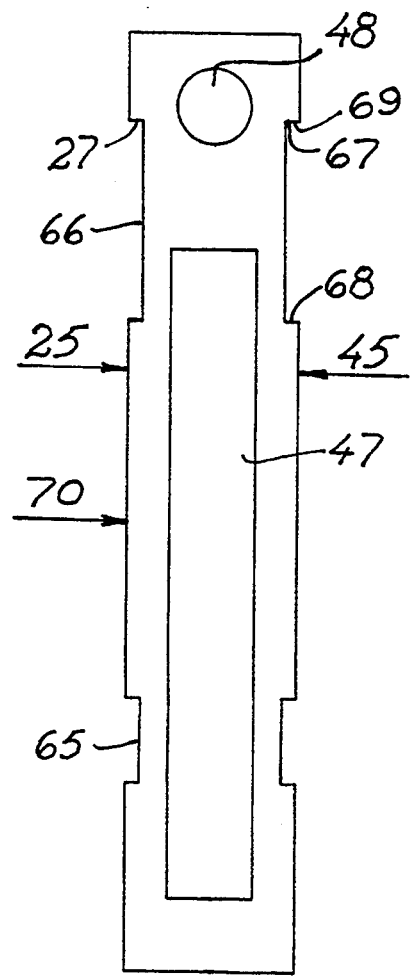

METHOD AND A DEVICE IN SPINDLES

BACKGROUND OF THE INVENTION

The present invention relates to a method in displacement of objects, for example in displacement of an object from a resting position to a working position or vice verse, and in which method a device is arranged comprising a screw with at least two threads of different pitches and which screw is arranged in engagement with a body or with one or more internal and with the screw matching threads shown by the body. At this the screw is arranged to a first object and the body to a second object. In the method the first object and/or the second object is brought to displace a distance when the screw and body are in engagement with one another in a first thread or for example a coarse thread and also subsequently when the screw and body are in engagement with one another in a second thread or for example a fine thread or vice verse.

In a great number of different situations there is a need to be able to rapidly displace an object in a device or in a direction towards or from a device or a second object, for example in order to attain a quick engagement or a quick release action and removal of a device or an object or other rapid movement. Often, it exists also a need to be able to increase the tightening tension, as when clamping a device, a material, etc. In applicable cases there is also a need to be able to reduce that power, which is required to arrange an object in a working position or to remove the object from a working position, as in a manual handling, for example when an object is clamped. In certain cases there is also a need to attain a function of self-obstruction. Areas where such a need exists are for example in clamping jaws, vices, puller tools, lifting jacks, various kinds of supporting legs, sliding valves, etc.

For carrying out a method it is required a device. In known devices in question one has been forced to compromise between good tension or tightening force action and high speed of the displacement. Thus, one has got a low tension in designs with rapid displacement of objects. One has got a slower displacement of objects in designs with improved tension. With regard to this it would be advantageous if one was able to make a rapid displacement of objects when none or low tension or tightening force action is needed and in cases when tension or high tension is needed be able to have the device to work with high tension.

In for example a supporting stand with a land wheel for a trailer, the stand is arranged releaseable from a folding position and shows a screw with a thread with a small pitch. At this the supporting stand can be dropped so that the land wheel will be situated close to a foundation, after which the vehicle or its chassis can be raised by rotating the screw. The rotation of the screw can be effected by manual power as the screw has a small pitch and the screw will also be self-obstructed. Of course, such a supporting stand can instead for being able to fold be arranged only vertically adjustable by rotation of the screw. In such a case the screw must, however, be rotated a great many revolutions to reach a working position and a resting or storing position respectively, which is i.a. time-consuming.

A previously known device which, however, has not been used in connection with supporting stands, shows a screw with two threads with different pitches and a nut, which is arranged with the screw with matching threads. By a radial turn of a part of the nut, an angular displacement of the threads is effected in said part in relation to the threads in the remaining part of the nut, whereby the nut can change from a first thread to a second thread of the screw. Such a method has, however, certain limitations, as it requires a manual handling and a turning of a part in a device in order to be able to carry out the method. The fields of application are further restricted for the method by the shaping and way of operation of the device. In addition, it has been shown difficult to carry out intended methods due to the shaping of the changing devices. The function of the screw and/or the nut has not been satisfactory. Further, the method is impossible to utilized in such occasions when the device for carrying out the method must be contained within a limited or small space.

SUMMARY OF THE INVENTION

The purpose of the present invention is to achieve a method where a displacement of an object can be done in a rapid way until the object reaches a working position. In applicable cases, in the working position shall the necessary power, which is needed to complete the method, be so low that the method can be carried out manually but still with sufficient or intended tension or tightening force action when necessary. A release of the object from the working position shall, where appropriate, also be able to be done manually as well as a rapid movement of the object to a resting or storing position. Further, the device used for the realizing of the method shall not need to be manually handled for a changing between different threads or a rapid movement or a slower transportation with improved tension. Utilization of the device shall mean an automatic function. When an improved tension or tightening force action is needed, it shall be able to be realized in a method for rapid movement of objects. A supporting stand for vehicles shall in a rapid way be able to be screwed to a working position, i.e. into touch with a foundation, from a removed and screwed-up position, which is done by rapid movement of the supporting stand in a thread of the screw with large pitch. The supporting stand changes automatically in the working position to another thread of the screw with a small pitch, whereby the intended tightening force action is attained and that the screw still can be easily rotated despite the loading of the vehicle. When the supporting stand again shall be moved to the removed and screwed-up position a changing to the first thread and transportation of the supporting stand is done inversely. In applicable cases it can be considered necessary to be able to secure the taken up and self-obstructed position between supporting stand and screw and therefore it ought to exists in said case a possibility for a locking operation. Said locking ought to operate automatically. A method in accordance with the invention has obtained the characteristics mentioned in claim 1.

The invention also relates to a device for carrying out the method. The device comprises hereby a screw or a spindle with a screw or spindle body with at least two threads with different pitches. The screw is arranged in engagement with a body or with one or more internal and with the screw matching threads or similar shown by the body. The device is characterized in that the said body consists of two bodies or nuts, which are arranged non-turnable with each other but axially displaceable with one another via the engagement with threads of the screw. The device can change from a first thread to a second thread or vice verse by changing the distance between the both bodies.

According to an embodiment of the device in accordance with the invention, the device comprises a load sensing device, whereby such a device is arranged in the both bodies and arranged to be able to be located with a part in one thread of the screw and be able to be brought out from the thread of the screw when a load arises.

In another embodiment of the device in accordance with the invention, the device comprises a locking device, which is arranged to hold both bodies in an occupied, relative, axially position or in a position where the bodies bear on each other. It is hereby ensured that the screw and bodies maintain a relative position with one another in a thread.

According to an additional embodiment of the device in accordance with the invention, the screw is arranged to a vehichle or a trailer, such as a trailer for a car, a caravan, or a chassis, a draw beam or a coupling device for such vehicles, and the body or bodies are arranged to a supporting stand for such vehicles. The supporting stand can hereby be provided with a land wheel.

In a device in accordance with the invention, the risk of operations being interrupted due to the device is substantially reduced or completely eliminated. Furthermore, the device is easily adapted to multiplicity of applications within widely differing fields.

BRIEF DESCRIPTION OF THE DRAWINGS

Further characteristics of and advantages with the method and device in accordance with the invention will be apparent in the following description of the invention by embodiment examples, whereby a simultaneous reference will be made to the accompanying schematic drawings, of which FIG. 4 shows partially in section a body according to one embodiment, FIG. 5 shows in cross-section a body according to a second embodiment, FIG. 6 shows from one side and partially in section a portion of a supporting stand and a part of a driving device connected with a device in accordance with the invention and according to one embodiment, FIGS. 11-14 shows from one side and partially in section a portion of a supporting stand with a device in accordance with the invention according to another embodiment, FIGS. 15-17 shows from one side and partially in section a portion of a supporting stand and a part of a device according to FIG. 6 and in different positions, FIG. 19 shows from one side two bodies according to a third embodiment and a part of a device in accordance with the invention according to a third embodiment and which device can form a device in the supporting stand according to FIG. 6 and FIGS. 15-17. FIG. 20 is a sectional view taken on plane 20—20 in FIG. 19, FIG. 21 shows the opposite side of the device, FIG. 22 is a sectional view taken on plane 22—22 in FIG. 19. FIG. 23 shows the device according to FIGS. 19-22 from below, FIG. 26 shows from one side and partially in section a portion of a supporting stand or the supporting stand according to FIG. 6 and in an upper position, FIG. 27 shows in cross-section two bodies according to a third embodiment, whereby the bodies have taken a second position, FIG. 28 shows from one side a wedge according to a second embodiment and FIG. 29 shows from one side a guiding means and a holder according to a second embodiment and a holder for the wedge according to FIG. 28.

DESCRIPTION OF THE PREFERRED EMBODIMENTS

Figure 1:
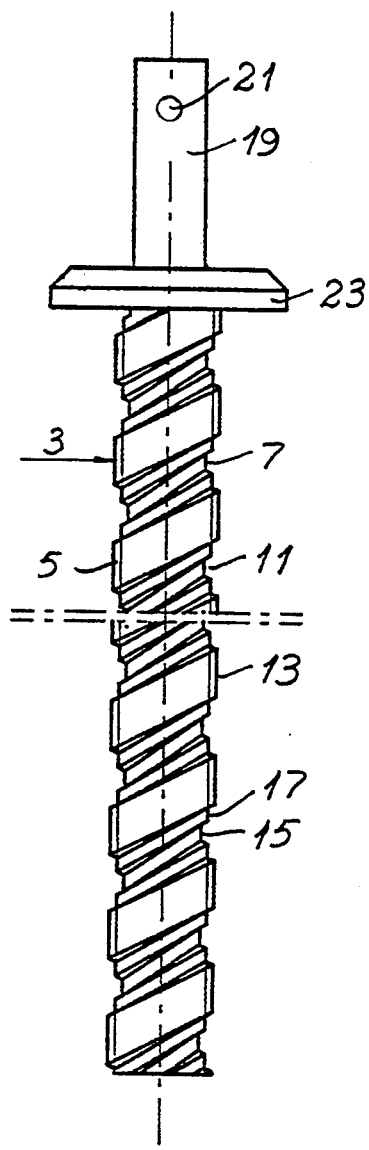
FIG. 1 shows from one side an embodiment of a screw.
Figure 2:
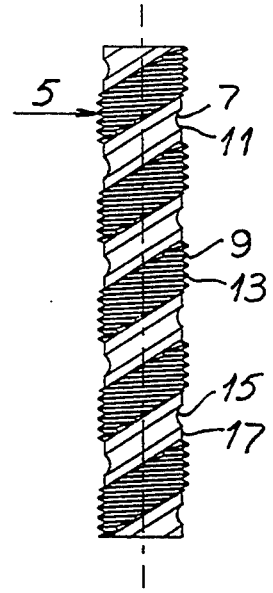
FIG. 2 shows from one side a portion of a screw body.

The reference designation 1 in FIGS. 6-17 and 26 shows parts of a device and in certain cases according to different embodiments. A device 1 in accordance with the invention comprises a screw 3 with a spindle body 5, see FIGS. 1-3, and a body 2, 4 or shaped as a first or lower body 2 and a second or upper body 4, see FIGS. 4, 5 and 27. The bodies 2, 4, which are in the form of nuts suited to the screw 3, are preferably provided with at least one controlling device in the form of a load sensing device 18.

The spindel body 5 of the screw 3 shows one or more threads 7, 9 or, according to the embodiment example, two threads, for example a first thread 7 or coarse thread and a second thread 9 or fine thread, whereby the threads have different thread pitches. Each of the threads 7, 9 are arranged in a separate spiral path 11 and 13 respectively along the spindle body 5. Thus, a spindle or a spindle body can be provided with a fine thread 9. Then the fine thread 9 can be eliminated in a spiral 11 extending helically around the spindle body, whereby the remaining fine thread 9 forms a second threaded helical spiral 13 with several entrances, while the first spiral 11 forms a spiral path or a groove, which does not have threads or substantially have any threads. In this way the first thread 7 or the coarse thread will divide the fine thread 9, which accordingly will have or can show a number of individual threads which, where appropriate, extend only over a part of the periphery of the spindle body 5. Preferably the first thread 7 is given a substantially larger pitch 18 than the individual threads in the second thread 9.

One end of the screw 3 can show an attachment portion 19 with an engagement device 21, for example in form of a hole for the attachment with an object or a driving device. A contact device 23, bearing, divider or the like can be arranged between the spindle body 5 or the threads 7, 9 and the attachment portion 19.

Figure 3:
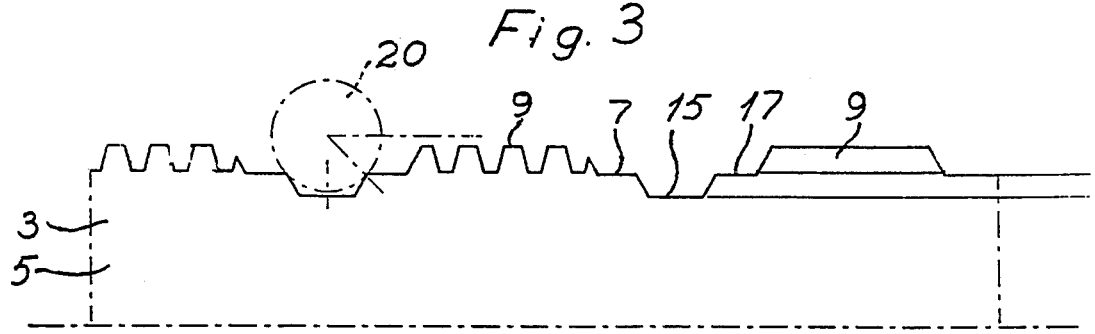
FIG. 3 shows in an enlarged scale a part of a screw.
Figure 7:
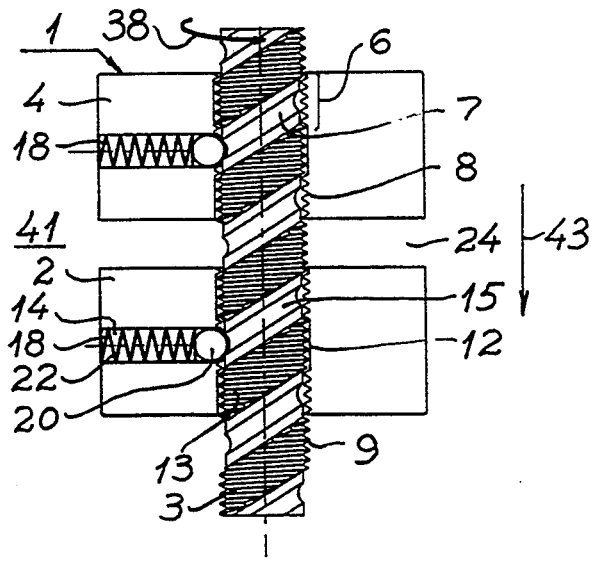
FIGS. 7-10 shows from one side and partially in section examples of a working process for a device in accordance with the invention according to one embodiment example.
Figure 8:
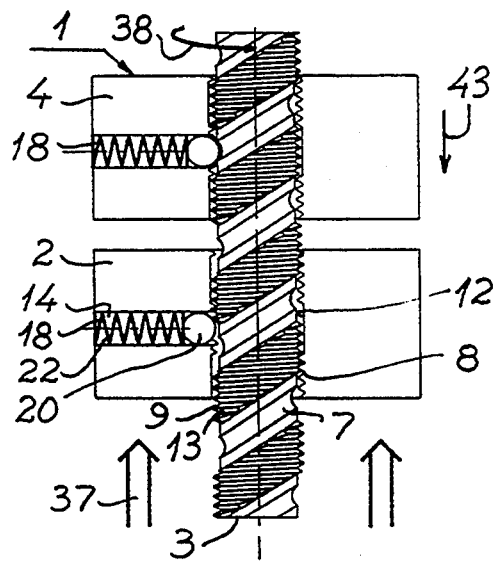
Figure 9:
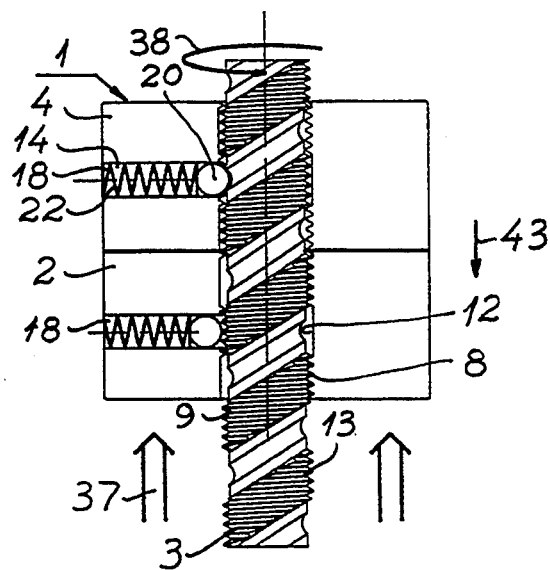
Figure 10:
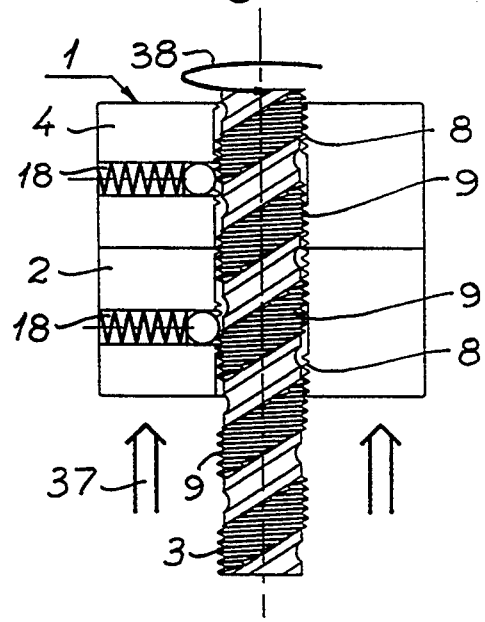

The said first thread 7 or coarse thread can show or be shaped with a groove 15 for a part 20 of a load sensing device 18 or a controlling device, for example in form of a ball or a so-called pilot ball, which is indicated in FIG. 3. On the side of the groove 15 exists surfaces 17 against the flanks of adjacent other threads 9 or fine threads.

The said body 2, 4 or both bodies show one or more internal threads 6, 8 or similar, matching respectively the threads 7, 9 of the screw 3, i.e. in accordance with the embodiment examples two threads with different pitches, as fine threads 8, which are arranged in a spiral 10. Thus, the bodies 2, 4 can be provided with a fine thread 8 which then being eliminated in a spiral 12 which, thus, will not have any threads. In this way the remaining fine thread 8 forms a spiral 10 with threads 8 with several entrances. The fine threads 8 in the threaded spiral 10 together form a coarse thread 6, i.e. that the threaded spiral 10 exists in the first thread 7 or coarse thread of screw 3, when screw 3 is arranged to run in the bodies 2, 4 or vice verse with an engagement between the screw and bodies in a first thread 7, 6 or a coarse thread. The fine threads 9 of screw 3 or threaded spiral path 13 exist hereby in the said spiral 12 of bodies 2, 4, which is in the form of a non threaded portion. When screw 3 is arranged to run in bodies 2, 4 or vice verse with an engagement between the screw and bodies in a second thread 9, 8 or a fine thread, at least some of the fine threads 7 of screw 3 are engaged with at least some of the individual fine threads 8 of bodies 2, 4.

As previously has been mentioned and according to the embodiment examples, there exist load sensing devices 18 in the bodies 2, 4 or one or more load sensing devices 18 in each body 2, 4. In order to bear the load sensing devices 18, the bodies 2, 4 show first openings 14 in form of holes, which extend through the bodies to that axially extending hole, which extends through the bodies for receiving the screw 3. In the embodiment in FIG. 5 there exists two openings 14, each opening arranged for a load sensing device 18 or a controlling device 20. In the embodiment in FIG. 27 there exists three openings 14, each opening arranged for a load sensing device 18 or a controlling device 20, as has been indicated, whereby one attains a more uniform division of the load sensing devices 18 and a more uniform loading on the spindle 5 and the risk is avoided that a body 2, 4 is going to tilt because of unbalanced loading. According to the embodiment examples the load sensing devices 18 form or comprise a controlling device 20 in the shape of a ball or a so-called pilot ball, which is elastically prestressed by a spring 22, for example a spiral spring. Further, the load sensing devices 18 are arranged in the middle of the threaded spiral 10 for the fine thread 8 or fine threads.

In FIG. 6 is shown a device 1 in accordance with the invention in form of a supporting device 30 with a supporting stand 35 for a vehicle, which is one of multiplicity of areas of use for a device in accordance with the invention. The vehicle can consist of various trailers, such as a trailer for a car, a caravan or a chassis, a draw beam or a coupling device for such vehicles, etc. The screw 3 is hereby arranged to a first object 31 or according to the embodiment example a chassis, a draw beam or a coupling device and can be driven by a driving device 33, as a motor, electric motor, manually by means of a crank 33, a handle or the like, as is shown in the figure, etc. and is attached with the screw's attachment portion 19 or its engagement device 21. A casing 34 can be arranged around the device 1 and the supporting stand 35. Besides the fact that the driving device 33 or the crank, etc. drives or rotates the screw 3, the driving device 33 or the crank, the screw 3 and the casing 34 are fixed and attached to the first object 31. When the screw 3 is turned or rotated in one way or the other by the driving device 33, the other object 32, consisting of the supporting stand 35, is displaced downwards and upwards respectively. The supporting stand 35 can be shaped as a pillar, tube or similar and in the end be provided with a supporting plate, supporting wheel or the like. When the supporting stand 35 or its supporting wheel or the like reaches a foundation, as ground, a floor, etc. the supporting stand stops, while the bodies 2, 4 continue to move downwards as the turning of the screw 3 is proceeded, whereby the first, lower body 2 soon is going to strike a load 37, according to the embodiment example a shoulder 36 in the supporting stand 35, and when the body 2 reaches the load 37 or the shoulder 36 the load influences the load sensing device 18 or the means in the body 2. The other, upper body 4 continues to move downwards until the body reaches the first, lower body 2, whereby the second body 4 also has reached a load, which influences the load sensing device 18 or the means in the body 4.

Device 1 in accordance with the invention is arranged to be able to effect at least two different displacements of screw 3 and/or one or more bodies 2, 4 or objects 31, 32 connected with the screw or body or bodies or according to the embodiment example an object 32 in order to effect a rapid transport of a supporting stand 35. Accordingly it is a question of device 1 being able to change between at least two different displacements, whereby this change preferably can be carried out automatically. Thus, device 1 comprises at least one load sensing device 18 which can be arranged to sense if a body 2, 4 or an object 31, 32 obtains a resistance, a load 2, 4, 36, 37, 61 or similar. For that reason the bodies 2, 4 are displaceable with one another in the axial direction of screw by the threads 7, 9 of screw 3.

With further reference to FIGS. 7–10 the function of the device 1 will be described and accordingly also the exemplified supporting device 30 or supporting stand 35 and the priciple for displacement of objects 31, 32, whereby a simultaneous reference will be made to FIGS. 11–14 and 15–17. Thus, it is evident that when the bodies 2, 4 or their coarse thread 6 run in the coarse thread 7 of screw 3, bodies 2, 4 are arranged at a distance 24 from one another and take up a first axial position 41 with one another. When the bodies 2, 4 or an object 32, which is connected with the body or bodies 2, 4, for example a supporting stand 35, or the screw 3 are displaced in a direction 43, see FIG. 7, a rapid displacement is done in coarse thread 7 of screw 3. Corresponding conditions are shown in the embodiments in FIGS. 11 and 15. It should be possible to say that device 1 is in a transporting position. When the first or lower body 2 or the said second object 32 or the supporting stand 35 gets or reaches a resistance or a load 36, 37 or the first body 2 according to the example reaches the shoulder 36 the load is sensed by the load sensing device 18 in the first body 2 by the fact that an axial loading is obtained on body when it strikes against the shoulder 36, whereby the first body 2 climbs the second thread 9 or fine thread of screw 3, i.e. the fine threads 8 or individual fine threads 8 of body 2 begin to enter adjacent fine threads 9 or threaded spiral 13 of screw 3. The second body 4 is still displaced in the first thread 7 or coarse thread of screw 3, see FIG. 8, until the second body 4 reaches the first body 2, see FIG. 9, whereby the second body 4 obtains a resistance or a load 2, 37 from the first body 2, which is sensed by a load sensing device 18 in the second body 4 by an axial loading on the body when it strikes the first body 2. In this connection the second body 4 also begins to climb the second thread 9 or fine thread of screw 3, etc., as has been described above in connection with the first body 2. When the second body 4 is engaged with the second thread 9 or fine thread of screw 3, i.e. when the individual threads 8 of the bodies 2, 4 are in engagement with the fine threads 9 of screw 3, the change from a first thread or coarse thread is carried out, see FIG. 10. Bodies 2, 4 or their threads 8 are now running in the fine thread 9 of screw 3 and the bodies 2, 4 are no longer situated at a distance from one another but take up a second axial position 42 with one another, see also FIGS. 13 and 17. The direction of turning or rotation of screw 3 is shown with arrows 38 in FIGS. 7–10.

When the resistance, load 2, 4, 36, 37 or similar reduces or ceases, the bodies 2, 4 or their threads 8 or fine threads 8 return to the first thread 7 or coarse thread of screw 3 in the reverse way, i.e. beginning with the second body 4, whereby a change occurs again.

The load sensing devices 18 are arranged in each body 2, 4 and according to the example comprise a controlling device 20, for example in the shape of a ball or a so-called pilot ball and a spring 22, which is arranged to hold the controlling device 20 against a base, which is the coarse thread 7 of screw 3 or the groove 15 in the coarse thread 7 or via the surfaces 17 to a contact position against the fine threads 9 or threaded spiral 13 of screw 3, when the body or bodies 2, 4 are transferred to the second position 42 and when they have taken up the second position 42. Against the action of spring 22, the controlling device 20 can be permitted to follow elevations in the base or screw 3.

According to the embodiment example in FIGS. 7–10, whereby the corresponding can be valid for the embodiments according for example FIGS. 11–14 and FIGS. 15–17, the load sensing device 18 controls or runs by means of a pilot ball 20 in the first thread 7 or coarse thread of screw 3 the displacement of the bodies 2, 4 during the rotation of screw 3 or vice verse.

Thus, the power exists on the balls 20. When a body 2, 4 is to climb a fine thread 9 of screw 3, the pilot ball 20 is pressed against the action of the spring 22 from the coarse thread 7 for contact against the fine thread 9, i.e. the pilot ball 20 is moved aside into the said first opening 14 and out of its controlling engagement with coarse thread 7. The bodies 2, 4 are thus mechanically operated by means of the load sensing device 18 or pilot ball 20 in the coarse thread 7 of screw 3 until a body 2, 4 or bodies reach a resistance, load 2, 4, 36, 37, 61 or similar, whereby when the load exceeds the limit load of pilot ball, the pilot ball is moved out of its controlling position and ceases the mechanical operation of the body 2, 4. It can be possible to say that the balls 20 form a supplying device, when an axial force is directed against the bodies 2, 4. The distance 24 between the bodies 2, 4, when the bodies are displaced in the first thread 7 or coarse thread of screw 3, is a coarse thread pitch.

The shown and described embodiment examples have referred to screws 3 and bodies 2, 4 with screw threads or similar with a change-over between different thread pitches, and even an automatic one. Such an automatic change-over can also be attained with so-called ball screws, when the screw 3 also shows at least two threads 7, 9 with different thread pitches or corresponding ball paths, while the bodies 2, 4 should show a ball path. When using a device 1 some form of resilient, load sensing work is usually carried out which, at a predetermined axial loading between screw 3 and bodies 2, 4 permits the bodies in turn to change from the one or a first thread and a second thread. When low loading again occurs the change is carried out in reverse. The bodies 2, 4 are not allowed to Change at the same time, whereby at least one of the bodies in a position is separated from the changing points. In this way the screw 3 can always bear a load, which corresponds to what a body can bear. However, the bodies 2, 4 must be able to move relatively to each other so that when changing take place they displace in different pitches, whereby the relative movement between the bodies is carried out under the angle of rotation of screw 3, as the changing is under way. According to one embodiment of device 1 in accordance with the invention or according to the embodiment examples, the said relative movement between the bodies 2, 4 is arranged to be carried out in the axial direction of screw 3, i.e. it is an axial movement. It should at least in other objects and displacements also be able to be a rotation or a combination of an axial movement and rotating.

The bodies 2, 4 are rotation-locked in relation to each other or arranged non-turnable with one another, which can be effected by a device, as a guiding means 25 which, according to the embodiment examples shown, is fixed arranged in the second, upper body 4 and runs in a slot 26 or groove in the bodies 2, 4 and shows in one end a stop or limiting means 27 for the bodies 2, 4 in order to limit the distance 24 between the bodies 2, 4.

Figure 18:
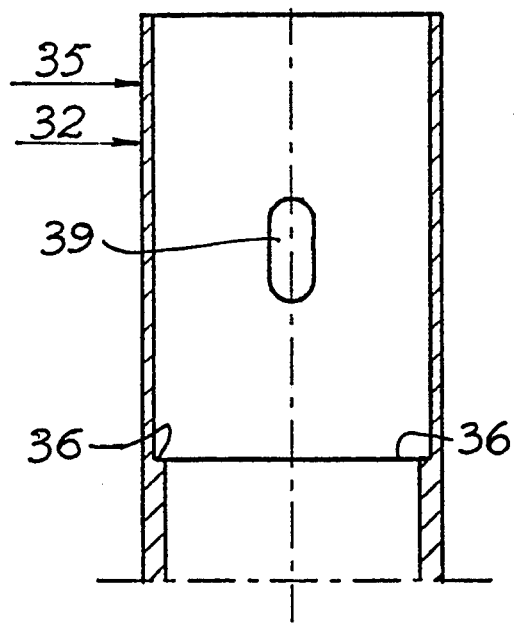
FIG. 18 shows from one side and in cross-section a part of a supporting stand.

With further reference to FIG. 18 it is shown a part of a second object 32 which, according to the embodiment example, consists of a supporting stand 35, in the upper part of which a device 1 in accordance with the invention can be arranged, whereby the shoulder 36 forms a stop and a resistance or a load 37 for the first body 2. Further, the stand 35 shows a first guiding and limiting device 39 with an upper striking surface, which guides and limits the movement of a locking device 44.

Figure 24:
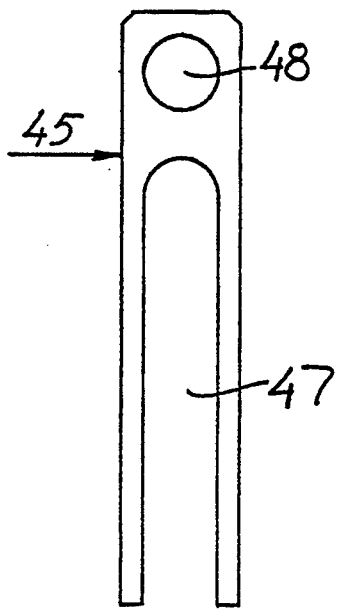
FIG. 24 shows from one side a holder, which can become part of a device in accordance with the invention, FIG. 25 from one side a mow able wedge, which can become part of a device in accordance with the invention.
Figure 25:
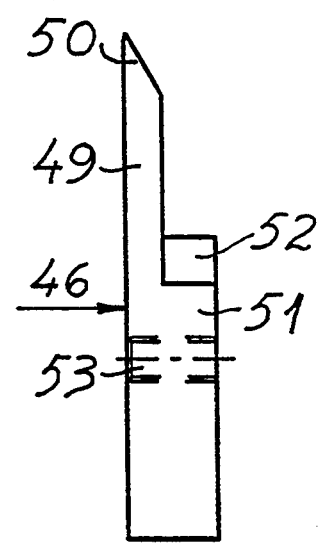

In FIG. 24 is shown a holder 45 for a movable wedge 46, see FIG. 25, and for a locking element 40. The holder 45 is shaped as a fork, i.e. with a recess 47, for receiving the movable wedge 46 and also shaped with a locking element 48, for example in the shape of a hole through the holder, for the locking element 40, which in the shape of a ball or similar shows a diameter, which exceeds the thickness of the holder, i.e. the ball can reach through the holder 45 and enter into a body 2, 4 or, according to the embodiment examples, the second, upper body 4 or into a seat for the locking element 40, which seat is shown by the body. According to the embodiment examples, the holder 45 shall be fixed arranged to the first, lower body 2.

The movable wedge 46 shows a protruding arm 49 with a wedge-shaped end portion 50, which shall be arranged to be able to reach outside and/or beyond the recess 47 of the holder 45 and in one position be able to reach in front of and/or beyond the holding element 48 of the holder 45. One part 51 of the movable wedge 46 is arranged to be able to be located in the recess 47 of the holder 45 and can show a tapering end portion 52, for example a spherical end portion, an end portion in the shape of a cone or a double-wedge. Further, the movable wedge 46 shows a holding means 53 for a second guiding or limiting device 54, for example in the shape of a threaded pin.

In FIGS. 19–23 is shown an example of a shaping of a part of the device 1 and the bodies 2, 4, whereby it appears that the device 1 can comprise a locking device 44, see FIG. 20, and that the load sensing device 18 can be kept in the device by holding devices 28 in form of for example springs of thin sheet-metal, which are held by pegs 29 or the like, see FIGS. 19 and 22. It appears from FIGS. 20 and 21 i.a. the holder 45 for the movable wedge and that the movable wedge rests on an elastic element 57. In order to limit the movement of the movable wedge 46, a lower stop 58 can be arranged. This stop 58 can consist of a tap or similar, which rests on or is arranged in a bottom or supporting element 56, see also FIG. 23. Said element 56, which can show a shape of substantially an U, forms a bottom element or a supporting element for elastic element 57 and also a holding means for stop 58 and is, as the holder 45, fixed arranged to first, lower body 2, for example by welding to the body 2. It appears also from FIG. 23 the slot 26 or the groove in the body 2, 4 for the guiding means 25.

The load sensing devices 18 can instead be kept in the device 1 by sealing devices furnished to the openings 14, which sealing devices, for example, can consist of rounds, which are driven in the end part of the openings 14 or in another way are attached into the openings and seal the openings and hold the pilot ball 20 or the controlling device in intended position with a spring 22 situated in between.

According to the embodiment examples, the locking device 44 is meant for being a locking mechanism, which locks screw 3 and bodies 2, 4 in their engagement or position in the fine thread 9 or in other words locks the bodies 2, 4 to a maintained connection to each other, i.e. keep the bodies 2, 4 in a taken, second position 42. The locking device 44 comprises, according to embodiment examples above, the holder 45, the movable wedge 46, the locking element 40, the elastic element 57 and a seat in a body 2, 4 which, according to the embodiment examples, consists of the said second opening 16 in the second, upper body 4. The first and second guiding or limiting devices 39 and 54 respectively contributes in guiding of the locking device 44 and limiting the movment of the movable wedge 46.

Figure 11:
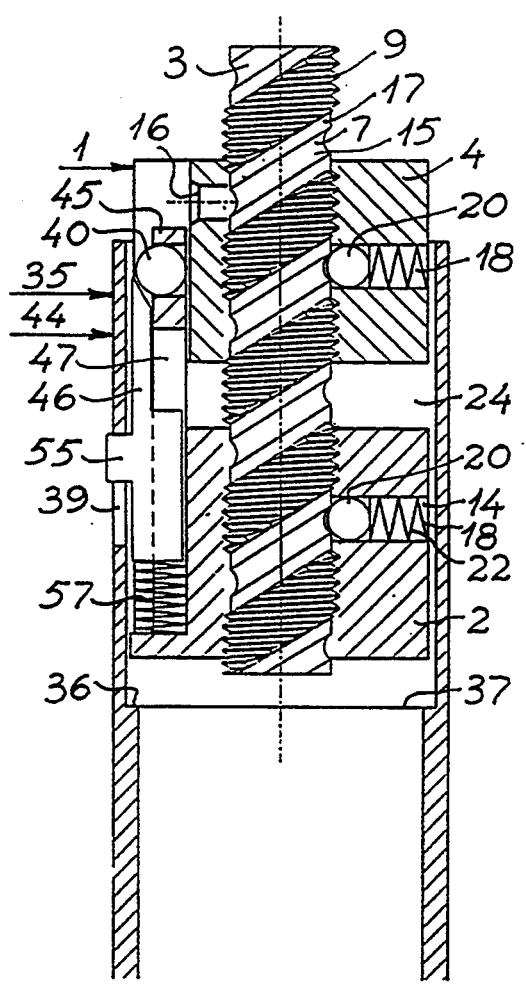
Figure 12:
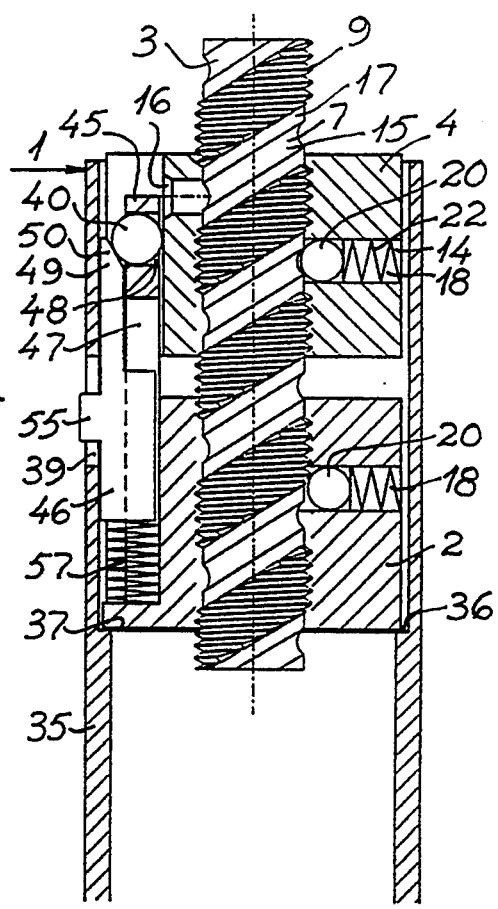

With reference to especially the embodiment in FIGS. 11–14 but also to the embodiment in FIGS. 15–17, it is shown in FIGS. 11 and 15 that the device 1 and the bodies 2, 4 are in a first position 41, whereby coarse threads 7 and 6 of the screw 3 and bodies 2, 4 respectively are in engagement with one another and that the load sensing device 18 controlls, supplies and drives with the controlling device 20 in the coarse thread 7 or its groove 15 of screw 3. The locking device 44 is not in engagement with the second opening 16 or seat in the body 4, i.e. is in an inactive position. The supporting stand 35 is suspended and the bodies 2, 4 or the lower body 2 being at a distance from the shoulder 36 or the load. The movable wedge 46 is kept in the inactive position by the fact that an engagement part 55 of the wedge or that the second guiding or limiting device 54 is arranged to project in engagement with the first guiding or limiting device 39 shown by the supporting stand 35, whereby, when the supporting stand is suspended in the air, the supporting stand can with its weight or loading on the engagement part 55 hold the movable wedge 46 in a pressed down position against the action of elastic element 57. The direction of the power is shown by arrow 59 in FIG. 15. In rotation of screw 3 a rapidly displacement of the supporting stand 35 towards a foundation is done. When the supporting stand 35 reaches the foundation, as it is shown in FIGS. 12 and 16, the power will change direction, which is shown by arrow 60 in FIG. 16, but the bodies 2, 4 will continue their displacement until that the lower body 2 reaches the shoulder 36, i.e. reaches a load 37, which also appears from FIG. 12, whereby a power is built up against the lower body 2, which change to the fine thread 9 of screw 3. When the supporting stand 35 does not displace further downwards the loading from the supporting stand 35 on the locking device 44 will cease, whereby the movable wedge 46 by the elastic element 57 will be displaced upwards. This is shown in FIG. 12 by the fact that the engagement part 55 leaves the upper end surface in the first guiding or limiting device 39 in the supporting stand 35. When the load 36, 37 exceeds the limit load of the load sensing device 18 or the controlling device 20, the lower body 2 begins with its fine thread 8 or fine threads to climb the fine thread 9 of screw 3, see FIG. 12. The controlling device 20 is prestressed by the spring 22 and when the controlling device 20 receives a power from the groove 15 and the surface 17 in the coarse thread 7 of the screw 3 and then by the fine thread 9 of the screw 3, the controlling device 20 is pressed into the first opening 14 against the action of spring 22. The fine threads 8 of the lower body 2 and the fine thread 9 of screw 3 can engage with one another. The upper body 4 will soon reach the lower body 2 and obtains a resistance or a load 37 of the lower body 2, whereby the upper body 4 begins with its fine thread 8 to climb the fine thread 9 of screw 3 in conformity with what has been described for the lower body 2. It appears from FIGS. 13 and 17 that the changing is carried out in the device 1 for the bodies 2, 4 in that the bodies have changed from the first thread or coarse thread to a second thread 9 or fine thread of screw 3, whereby the second position 42 is attained and the bodies 2, 4 lie against each other. By the engagement of screw 3 and bodies 2, 4 with one another in a fine thread, there exists a function of self-obstruction. The movable wedge 46 is kept by the elastic element 57 in an upwards displaced position in the device 1, i.e. the engagement part 55 lie against the upper end surface of the first guiding or limiting device 39 which, thus, prevents the movable wedge 46 from being displaced further upwards in the device 1. When the upper body 4 has reached and lie against the lower body 2 has, according to the embodiment examples, the locking device 44 taken up a position, in which it can be active, i.e. the second opening 16 in the upper body 4, which forms a seat for the locking element 40, is now in front of the locking element 40 by the continued displacement of the body simultaneously as the movable wedge 46 has been displaced upwards by the elastic element 57. Thus, the movable wedge 46 has been displaced in the recess 47 of the holder 45 and the protruding arm 49 with the wedge-shaped end portion 50 has by the displacement forced the locking element 40 against the seat in the second opening 16 in the upper body 4. The both bodies 2, 4 have by that been locked against a relative unintentional axial displacement and that independent of the direction of rotation of screw 3. The active locking position for the locking device 44 is apparent from FIGS. 13 and 17. The locking is active as long as load exists and locking engagement of the locking element 40 is secured by the elastic element 57, which holds the movable wedge 46 in the upwards displaced position. The object or objects 31, 32 can now be displaced under tightening force action, as screw 3 and bodies 2, 4 are in engagement with one another in the fine thread. When the load 37 changes direction and when the bodies 2, 4 in the locked position with each other are displaced upwards in the device 1 or from the shoulder 36, the supporting stand 35 will force or press the movable wedge 46 downwards, which by that ceases to hold locking element 40 in the locking position, see FIG. 14. The locking element 40 can hereby move out of the said second opening 16 or seat and a changing back to the coarse thread can be done by the fact that the bodies 2, 4 again can move relative to each other in axial direction and be separated from the contact against each other. The rechanging is done in the reverse way, i.e. the second, upper body 4 leaves the engagement in the fine thread and climbs the coarse thread and then also the first, lower body 2. The objects 31, 32 or the second object 32 or the supporting stand 35 can hereby again be displaced in a first thread or coarse thread for rapid movement.

It has been shown in tests with certain objects where a device 1 in accordance with the invention has been used that it can exist a risk that at least one of the bodies 2, 4 in the bodies 2, 4 engagement with and position in the fine thread unintentional can leave fine thread or jump back to an engagement with first thread or coarse thread which, especially when a large loading exists, can involve inconveniences. Such possible arising problems can be eliminated with the locking device 44. In for example a supporting device 30 with supporting stands 35, such an unintentional rechanging could happen when screw 3 by mistake will be rotated the other way while device 1 is under tightening force action by engagement in fine thread and hole loading exists on the supporting stand. Such a possible unintentional rechanging is prevented by a locking device 44 in accordance with the invention, which locking device thus forces the bodies 2, 4 in position with fine thread.

In FIG. 26 is shown that the supporting device 30 and the supporting stand 35 are raised or screwed up to an upper end position, i.e. the supporting stand 35 suspends and freely from contact with a foundation. When the second, upper body 4 obtains a resistance or a load 37, according to the embodiment by a means 61, which consists of an o-ring, the body 4 changes to an engagement with fine thread by the axial load from means 61. When the first, lower body 2 reaches the upper body 4 and obtains a resistance or a load 4, 37 of the upper body 4, the lower body 2 also changes to an engagement with fine thread by the axial load from the upper body 4. The device 1 or the bodies 2, 4 can by the engagement in fine thread be displaced with an improved tension or tightening force action and to compressing or further compressing of the means 61 between the upper body 4 and the contact device 23 and is self-constructed. By the existence of the self-construction and when no hevier loading exists on the second object 32 or the supporting stand 35, there is no need for locking the bodies 2, 4 in fine thread, i.e. the locking device 44 does not need to be activated even if the locking element 40 is in position in front of the said second opening 16 or seat by the fact that the bodies 2, 4 are connected with or bear on each other. Besides, there is some frictional locking with the means 61. The movable wedge 46 is held in a pressed down position and the arm 49 of the movable wedge 46 does not reach the locking element 40 to activate the locking element 44 and bring the locking element 40 into an engagement with the upper body 4 by the fact that the movable wedge 46 or its engagement part 55 is in engagement with the supporting stand 35 or its first guiding or limiting device 39 or by the fact that the supporting stand 35 with the upper end surface in the first guiding or limiting device 39 bear on the engagement part 55. With reference designation 62 is shown a bearing, which can be arranged between the objects 31, 32 or between the contact device 23 and the casing 34.

In FIG. 28 is shown an alternative shaping of a wedge 64, which forms a part of the locking device 44 but is fixed anchored in the device 1 contrary of the other, previously mentioned movable wedge 46. The wedge 64 shows in conformity with the other wedge a protruding arm 49 with a wedge-shaped end portion 50 and a holding means 53, for example in form of a hole 63 through the wedge 64 for anchoring of the wedge to a body 2, 4 or, according to the embodiment examples, the first, lower body 2 by a anchoring device, as a screw. The wedge 64 shall not be provided with a second guiding or limiting device 54 and can also be without the tapering end portion 52. As the wedge is fixed to the locking device 44 it is allowed a simpler shaping of device 1 and locking device 44.

According to a previous embodiment there exists in the device 1 a guiding means 25, i.a. in order to hold the bodies 2, 4 non-turnable with one another and a holder 45 for the wedge or the movable wedge 46 and a locking element 40. In an embodiment of the device 1 in accordance with the invention, the said guiding means 25 and holder 45 can be shaped in one and the same part and forms a holder for the locking element 40 and together with the wedge 64, which is fixed anchored, and the locking element 40 form in the view of construction and design a substantially simplified locking device 44 and at the same time a stop or limiting means 27, 67 for the bodies 2, 4. The wedge 64 is fixed anchored in a body 2. Thus, in FIG. 29 is shown a guiding means 70 according to a second embodiment, which guiding means accordingly can replace the other, previous guiding device 25 and the stop or limiting means 27 and also the other, previous holder 45, whereby only a slot 26 or groove in the bodies 2, 4 is needed for receiving the guiding means 25 and the holder 45, i.e. the guiding means 70.

In conformity with the description of the alternative shaped wedge 64, it is going to be used in description of the guiding means 70, where appropriate, corresponding reference designations as in the description of the other, previous guiding means 25 and movable wedge 46 for such parts having corresponding or principally corresponding function. A slot 26 or groove is arranged in the bodies 2, 4, whereby in the direction towards the slot is arranged protruding edges or flanges. According to the embodiment examples, the guiding means 70 is shaped with a waist 65 or recess matching the said edge in the first, lower body 2 and a wider waist 66 or recess for the said edge in the second, upper body 4. Owing to this, the guiding means 70 can be fitted into the slot 26 and be held in the device 1 by the engagement of the said edge in the first, lower body 2 with the narrower waist 65. The second, upper body 4 can be displaced axially in the device 1 between the first position 41 and second position 42 by the fact that the wider waist 66 shows a sufficient width. A lower end edge 68 in the waist 66 may not prevent the bodies 2, 4 from the possibility to take the second position 42 and does not either be needed to form a stop or contact means for the second, upper body 4, as the second, upper body shall be able to connect with and can make contact against the first, lower body. On the other hand can an upper end edge 69 in the waist 66 form a stop 67 or a contact means for the second, upper body 4 or the said edge in the slot 26 in order to limit the distance 24 between the bodies 2, 4, when the device 1 or bodies 2, 4 shall take the first position 41 and in that respect form the previous mentioned stop or limiting means 27. Further, the guding means 70 shows a recess 47, in which the wedge 64 is arranged to extend, and a holding element 48 for the locking element 40.

The wedge 64 and the guiding means 70 are fixed arranged in the first, lower body 2, whereby when the first, lower body reaches a resistance or a load 36, 37 the second, upper body 4 will approach the first, lower body 2 and when the upper body 4 strikes against the lower body 2 the locking element 40 will be situated in front of the second opening 16 in the upper body 4 and the wedge 64 will force and hold the locking element 40 against the seat in the second opening 16. When the second, upper body 4 reaches a resistance or a load 61 the first, lower body 2 will approach the upper body 4 and the wedge 64 with the locking element 40 will approach the second opening 16 in the upper body 4 and the wedge with the wedge-shaped end portion 50 will force the locking element 40 in the direction towards the seat in the second opening 16 and when the lower body 2 connects the the upper body 4, whereby the locking element 40 is in front of the second opening 16, hold the locking element 40 against the seat in the opening 16. The two bodies 2, 4 are by that locked and prevent a relative unintentional axial displacement with each other. Such a locking device 44 can replace the locking device 44, which appears from for example FIGS. 6, 11-17, 20, 22 and 26 and is more complicated.

Such a modified locking device 44 comprises the wedge 64, the locking element 40, a seat in a body 2, 4, which seat according to the embodiments consists of the second opening 16 in the second, upper body 4, and the guiding means 70 which, however, also has other functions than to form a holder 45 for the locking element 40, as previous has been mentioned. Besides what has previously been clear, there are no need of i.a. the first guiding or limiting device 39 in a second object 32 or according to the embodiment in the supporting stand 35 and with an upper end surface for influence on the second guiding or limiting device 54 showing the projecting engagement part 55, which is not either needed. Further, there are not either any need of limiting devices for the wedge, as the stop 58 with the elastic element 57 for the function of the wedge and the bottom or supporting element 56 for the elastic element 57 and the stop 58, as the wedge is fixed arranged in a body. In addition, one avoids the complicated operation and dependence of the influence on the wedge or the engagement part 55 of the movable wedge 46 of the second object 32 or supporting stand 35 and dependence of the elastic element 57. The operation of the locking device is in the modified locking device dependence of the bodies 2, 4 relative, axial position with each other and displacement and appears from previous description. The positions and the displacement of the bodies 2, 4 are fundamental in the device 1 in accordance with the invention and this function must still be ensured for the operation of device.

The locking device 44 can be held in the device 1 by a surrounding tube or similar or according to the embodiment example by the first object 32 or supporting stand 35.

When the method is used in connection with for example a supporting device 30 or a supporting stand 35, it is occurring that the supporting stand 35 or the device 1 is soiled, for example of dirt from the roadway or the like, which normally have an injurious influence on a device or threads of such an exposed object. The device 1 or screw 3 in accordance with the invention is, however, self-cleaning by any collected dirt or the like on screw 3 or spindle body 5 being removed when the device is used. When the screw 3 and bodies 2, 4 are engaged in the fine thread, and on movement between the screw and the bodies, the dirt will be transported to coarse thread 7 of screw 3, fall off or be scraped off by threads or the said threaded spiral of bodies 2, 4, when screw 3 and bodies 2, 4 are engaged in the coarse thread.

Without exceeding the scope of the concept of the invention, modifications of the method and device in accordance with the invention should be possible. Thus, the method and device can, after constructive adaptation if any, be used within a multiplicity different fields and for a widely differing objects than the objects shown in the embodiment examples concerning the supporting device and the extension and contraction of a supporting stand. If it should be necessary and perhaps within other fields of application to lock the bodies against unintentional, relative axial displacement, when the bodies are engaged in the fine thread and in that respect in other positions than in a stressed position with heavy loading, it ought to be possible to shape and adapt the device for such an utilization. The guiding means can be shaped adjustable, whereby the said distance between the bodies should be able to be adjusted or changed, as when other or more threads are utilizied. The said second guiding or limiting device with the engagement part can, as it has been appeared, be shaped in one piece with the movable wedge. The shaping and constructive connection to the device of the exemplified supporting stand can be another. The method and device is thus not restricted to what has been appeared from the embodiment examples but solely by the following claims.

We claim:

1. A device for displacement of objects comprising a screw with a spindle body and two bodies movable axially thereon, in which the screw has two sets of threads with different pitches and the two bodies are axially movable on said screw, each of said axially movable bodies being selectively engageable with either of said sets of threads, and said axially movable bodies being axially displaceable relative to each other.

2. A device in accordance with claim 1, in which the said axially movable bodies are non-rotatable relative to each other, whereby the bodies can be selectively engaged with either of said sets of threads by changing the distance between them.

3. A device in accordance with claim 1, having load-responsive means for causing each of said axially movable bodies to disengage one thread of said set and to engage the other thread of said set when it encounters a predetermined load.

4. A device in accordance with claim 1, including locking means arranged to hold both of said axially movable bodies in a predetermined relative axial position.

5. A device for displacement of objects comprising a screw with a spindle body and at least one body movable axially thereon, in which the screw has two sets of threads with different pitches and the movable body is selectively engageable with either of said sets of threads, and having a load sensing means in said axially movable body, said load sensing means being engageable with one of said sets of threads and being releasable from said one set of threads upon encountering a predetermined load.

* * * * *